US006222927B1

(12) United States Patent

Feng et al.

(10) Patent No.: US 6,222,927 B1

(45) Date of Patent: Apr. 24, 2001

(54) BINAURAL SIGNAL PROCESSING SYSTEM AND METHOD

(75) Inventors: Albert S. Feng; Charissa R. Lansing, both of Champaign; Chen Liu, Urbana; William O'Brien; Bruce C. Wheeler, both of Champaign, all of IL (US)

(73) Assignee: The University of Illinois, Urbana, IL (US)

(*) Notice: Subject to any disclaimer, the term of this patent is extended or adjusted under 35 U.S.C. 154(b) by 0 days.

(21) Appl. No.: 08/666,757

(22) Filed: Jun. 19, 1996

(51) Int. Cl.[7] .................................................... H04B 15/00

(52) U.S. Cl. .......................... 381/94.2; 381/92; 381/94.1

(58) Field of Search ................................ 381/94.7, 94.1, 381/94.2, 94.3, 92

(56) References Cited

U.S. PATENT DOCUMENTS

| | | | |
|---|---|---|---|
| 4,025,721 | 5/1977 | Graupe et al. . | |
| 4,611,598 | 9/1986 | Hortmann et al. . | |
| 4,703,506 | 10/1987 | Sakamoto et al. . | |
| 4,752,961 * | 6/1988 | Kahn | 381/92 |
| 4,773,095 | 9/1988 | Zwicker et al. . | |
| 5,029,216 | 7/1991 | Jhabvala et al. . | |
| 5,289,544 | 2/1994 | Franklin . | |
| 5,325,436 | 6/1994 | Soli et al. . | |
| 5,400,409 * | 3/1995 | Linhard | 381/94.7 |
| 5,417,113 | 5/1995 | Hartley . | |
| 5,473,701 * | 12/1995 | Cezanne | 381/94.7 |
| 5,479,522 | 12/1995 | Lindemann et al. . | |
| 5,485,515 * | 1/1996 | Allen | 381/94.7 |
| 5,495,534 | 2/1994 | Inanaga et al. . | |
| 5,511,128 | 4/1996 | Lindemann . | |
| 5,651,071 | 7/1997 | Lindemann et al. . | |
| 5,706,352 | 1/1998 | Engebretson et al. . | |
| 5,757,932 | 5/1998 | Lindemann et al. . | |
| 5,768,392 | 6/1998 | Graupe . | |
| 5,793,875 | 8/1998 | Lehr et al. . | |
| 5,825,898 * | 10/1998 | Marash | 381/94.7 |

OTHER PUBLICATIONS

M. Bodden, Auditory Demonstrations of a Cocktail–Party–Processor, Acustica, (1996) vol. 82 356–357.

Anthony J. Bell and Terrance J. Sejnowski, An Information–Maximization Approach to Blind Separation and Blind Deconvolution, Neural Computation, (1995), p. 1129.

Markus Bodden, Modeling Human sound–source localization and the cocktail–party–effect Acta Acustica, (1993), 43–55.

D. Banks, Localisation and separation of simultaneous voices with two microphones, IEE, (1993), vol. 140, No. 4, p. 229.

(List continued on next page.)

*Primary Examiner*—Minsun Oh Harvey

(74) *Attorney, Agent, or Firm*—Woodard, Emhardt, Naughton Moriarty & McNett

(57) ABSTRACT

A desired acoustic signal is extracted from a noisy environment by generating a signal representative of the desired signal with a processor for a hearing aid device. The processor receives binaural signals from two microphones at different locations. The binaural inputs to the processor are converted from analog to digital format and then submitted to a discrete Fourier transform process to generate discrete spectral signal representations. The spectral signals are delayed by a number of time intervals in a dual delay line to provide a number of intermediate signals, each corresponding to a different position relative to a desired signal source. Location of the noise source is determined and the spectral content of the desired signal is determined from the intermediate signal corresponding to the noise source location. Inverse transformation of the selected intermediate signal followed by digital to analog conversion provides an output signal representative of the desired signal.

29 Claims, 9 Drawing Sheets

OTHER PUBLICATIONS

R.W. Stadler and W.M. Rabinowitz, On the potential of fixed arrays for hearing aids, Journal of Acoustical Society of America, (1993), vol. 94, No. 3. p. 1332.

Wim Soede, Augustinus J. Berkhout and Frans A. Bilsen, Development of a Directional hearing instrument based on array technology, Journal Acoustical Society of America, (1993), vol. 94, No. 2., p. 785.

W. Lindemann, Extension of a binaural cross–correlation model by contralateral inhibition. I. Simulation of lateralization for stationary signals, Journal of the Acoustical Society of America, (1986), vol. 80 No. 4, p. 1608.

An Information–Maximization Approach to Blind Separation and Blind Deconvolution: Anthony J. Bell, Terrence J. Sejnowski; Article, Howard Hughes Medical Institute, Computational Neurobiology Laboratory, the Salk Institute; pp. 1130–1159 (1995).

* cited by examiner

BINAURAL SIGNAL PROCESSING SYSTEM AND METHOD

BACKGROUND OF THE INVENTION

The present invention is directed to the processing of acoustic signals, and more particularly, but not exclusively, relates to the separation of acoustic signals emanating from different sources by detecting a mixture of the acoustic signals at multiple locations.

The difficulty of extracting a desired signal in the presence of interfering signals is a long-standing problem confronted by acoustic engineers. This problem impacts the design and construction of many kinds of devices such as systems for voice recognition and intelligence gathering. Especially troublesome is the separation of desired sound from unwanted sound with hearing aid devices. Generally, hearing aid devices do not permit selective amplification of a desired sound when contaminated by noise from a nearby source—particularly when the noise is more intense. This problem is even more severe when the desired sound is a speech signal and the nearby noise is also the result of speech (e.g. babble). As used herein, "noise" refers not only to random or non deterministic signals, but also to undesired signals and signals interfering with the perception of a desired signal.

One attempted solution to this problem has been the application of a single, highly directional microphone to enhance directionality of the hearing aid receiver. This approach has only a very limited capability. As a result, spectral subtraction, comb filtering, and speech-production modeling have been explored to enhance single microphone performance. Nonetheless, these approaches still generally fail to improve intelligibility of a desired speech signal, particularly when the signal and noise source are in close proximity.

Another approach has been to arrange a number of microphones in a selected spatial relationship to form a type of directional detection beam. Unfortunately, when limited to a size practical for hearing aids, beam forming arrays also have limited capacity to separate signals which are close together—especially if the noise is more intense than a desired speech signal. In addition, in the case of one noise source in a less reverberant environment, the noise cancellation provided by the beam-former varies with the location of the noise source in relation to the microphone array. R. W. Stadler and W. M. Rabinowitz, *On the Potential of Fixed Arrays for Hearing Aids*, 94 Journal Acoustical Society of America 1332 (September 1993), and W. Soede et al., *Development of a Directional Hearing Instrument Based on Array Technology*, 94 Journal of Acoustical Society of America 785 (August 1993) are cited as additional background concerning the beam forming approach.

Still another approach has been the application of two microphones displaced from each other to provide two signals to emulate certain aspects of the binaural hearing system common to humans and many types of animals. Although certain aspects of biologic binaural hearing are still not fully understood, it is believed that the ability to localize sound sources is based on evaluation of binaural time delays and sound levels across different frequency bands associated with each of the two sound signals. The localization of sound sources with systems based on these interaural time and intensity differences is discussed in W. Lindemann, *Extension of a Binaural Cross-Correlation Model by Contralateral Inhibition—I. Simulation of Lateralization for Stationary Signals*, 80 Journal of the Acoustical Society of America 1608 (December 1986). Nonetheless, the separation of a desired signal from noise or interfering sound still presents a significant problem once the sound sources are localized.

For example, the system set forth in Markus Bodden, *Modeling Human Sound-Source Localization and the Cocktail-Party-Effect*, 1 Acta Acustica 43 (February/April 1993) employs a Wiener filter including a windowing process in an attempt to derive a desired signal from binaural input signals once the location of the desired signal has been established. Unfortunately, this approach results in significant deterioration of desired speech fidelity. Also, the system has only been demonstrated to suppress noise of equal intensity to the desired signal at an azimuthal separation of at least 30 degrees. A more intense noise emanating from a source spaced closer than 30 degrees from the desired source still appears to present a problem. Moreover, the proposed algorithm of the Bodden system is computationally intense—posing a serious question of whether it can be practically embodied in a hearing aid device.

Another example of a two microphone system is found in D. Banks, *Localisation and Separation of Simultaneous Voices with Two Microphones*, IEE Proceedings-I, 140 (1993). This system employs a windowing technique to estimate the location of a sound source when there are non overlapping gaps in its spectrum compared to the spectrum of interfering noise. This system cannot perform localization when wide-band signals lacking such gaps are involved. In addition, the Banks article fails to provide details of the algorithm for reconstructing the desired signal. U.S. Pat. No. 5,479,522 to Lindemann et al.; U.S. Pat. No. 5,325,436 to Soli et al.; U.S. Pat. No. 5,289,544 to Franklin; and U.S. Pat. No. 4,773,095 to Zwicker et al. are cited as sources of additional background concerning dual microphone hearing aid systems.

These binaural systems still fail to provide for the extraction of an intelligible speech signal subject to acoustic interference emanating from a nearby noise source. Thus, a need remains for a way to extract a desired acoustic signal from a noisy environment which minimizes degradation of the desired signal fidelity and which may be practically embodied into a device such as a hearing aid.

SUMMARY OF THE INVENTION

One feature of the present invention is utilizing two sensors to provide corresponding binaural signals from which the relative separation of a first acoustic source from a second acoustic source may be established as a function of time, and the spectral content of a desired acoustic signal from the first source may be representatively extracted. One aspect of this feature is that the desired acoustic signal may be successfully extracted even if a nearby noise source is of greater relative intensity.

Another feature of the present invention is detecting an acoustic excitation at a first location to provide a corresponding first signal and at a second location to provide a corresponding second signal. This excitation includes a desired acoustic signal from a first source and an interfering acoustic signal from a second source spaced apart from the first source. The second source is localized relative to the first source as a function of the first and second signals. A characteristic signal is generated which is representative of the desired acoustic signal during the localization.

Still another feature is delaying the first and second signals by a number of time intervals to correspondingly establish a number of delayed first signals and a number of delayed second signals. A time increment corresponding to the separation of the first and second sources is determined by comparing the delayed first signals to the delayed second signals. An output signal representative of the desired signal is generated as a function of the time increment. Furthermore, a signal pair indicative of the location of the second source may be selected that has a first member selected from the delayed first signals and a second member from the delayed second signals. The output signal may be generated as a function of this signal pair.

In yet another feature, a processing system utilizes a first and second sensor at different locations to provide a binaural representation of an acoustic signal which includes a desired signal emanating from a selected source and an interfering signal emanating from a interfering source. A processor generates a discrete first spectral signal and a discrete second spectral signal from the sensor signals. The processor delays the first and second spectral signals by a number of time intervals to generate a number of delayed first signals and a number of delayed second signals and provide a time increment signal. The time increment signal corresponds to separation of the selected source from the noise source. The processor generates an output signal as a function of the time increment signal, and an output device responds to the output signal to provide a sensory output representative of the desired signal.

Among the other features of the present invention is a system to position a first and second sensor relative to a first signal source with the first and second sensor being spaced apart from each other and a second signal source being spaced apart from the first signal source. A first signal is provided from the first sensor and a second signal is provided from the second sensor. The first and second signals each represent a composite acoustic signal including a desired signal from the first signal source and an unwanted signal from the second signal source. A number of spectral signals are established from the first and second signals as a function of a number of frequencies. Each of the spectral signals, such as those corresponding to outputs of a delay line, represent a different position relative to the first signal source. A member of the spectral signals representative of position of the second signal source is determined, and an output signal is generated from the member which is representative of the first signal. This feature facilitates extraction of a desired signal from a spectral signal determined as part of the localization of the interfering source. As a result, localization calculations constitute the bulk of the signal processing because, once localization of the interfering source is performed, the desired signal is estimated directly from one of the intermediate localization operands. This approach avoids the extensive post-localization computations required by many binaural systems.

Accordingly, it is one object of the present invention to provide for the extraction of a desired acoustic signal from a noisy environment.

Another object is to provide a device for the separation of acoustic signals by detecting a combination of these signals at two locations. This device may be used to aid impaired hearing.

Further objects, features, and advantages of the present invention shall become apparent from the detailed drawings and descriptions provided herein.

DESCRIPTION OF THE PREFERRED EMBODIMENT

Figure 1:
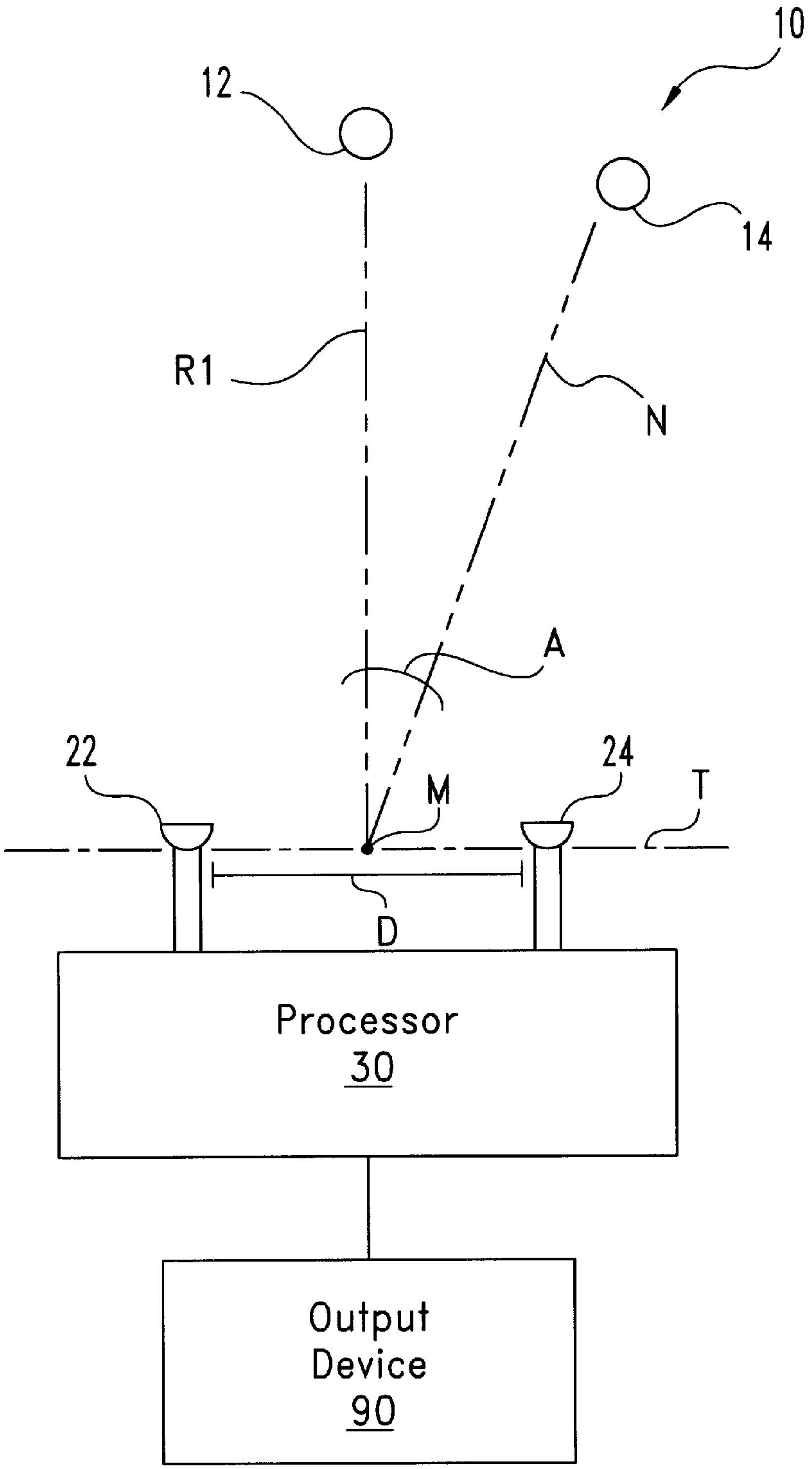
FIG. 1 is a diagrammatic view of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 illustrates an acoustic signal processing system 10 of the present invention. System 10 is configured to extract a desired acoustic signal from source 12 despite interference or noise emanating from nearby source 14. System 10 includes a pair of acoustic sensors 22, 24 configured to detect acoustic excitation that includes signals from sources 12, 14. Sensors 22, 24 are operatively coupled to processor 30 to process signals received therefrom. Also, processor 30 is operatively coupled to output device 90 to provide a signal representative of a desired signal from source 12 with reduced interference from source 14 as compared to composite acoustic signals presented to sensors 22, 24 from sources 12, 14.

Sensors 22, 24 are spaced apart from one another by distance D along lateral axis T. Midpoint M represents the half way point along distance D from sensor 22 to sensor 24. Reference axis R1 is aligned with source 12 and intersects axis T perpendicularly through midpoint M. Axis N is aligned with source 14 and also intersects midpoint M. Axis N is positioned to form angle A with reference axis R1. FIG. 1 depicts an angle A of about 20 degrees. Notably, reference axis R1 may be selected to define a reference azimuthal position of zero degrees in an azimuthal plane intersecting sources 12, 14; sensors 22, 24; and containing axes T, N, R1. As a result, source 12 is "on-axis" and source 14, as aligned with axis N, is "off-axis." Source 14 is illustrated at about a 20 degree azimuth relative to source 12.

Preferably sensors 22, 24 are fixed relative to each other and configured to move in tandem to selectively position reference axis R1 relative to a desired acoustic signal source. It is also preferred that sensors 22, 24 be a microphones of a conventional variety, such as omnidirectional dynamic microphones. In other embodiments, a different sensor type may be utilized as would occur to one skilled in the art.

Figure 2:
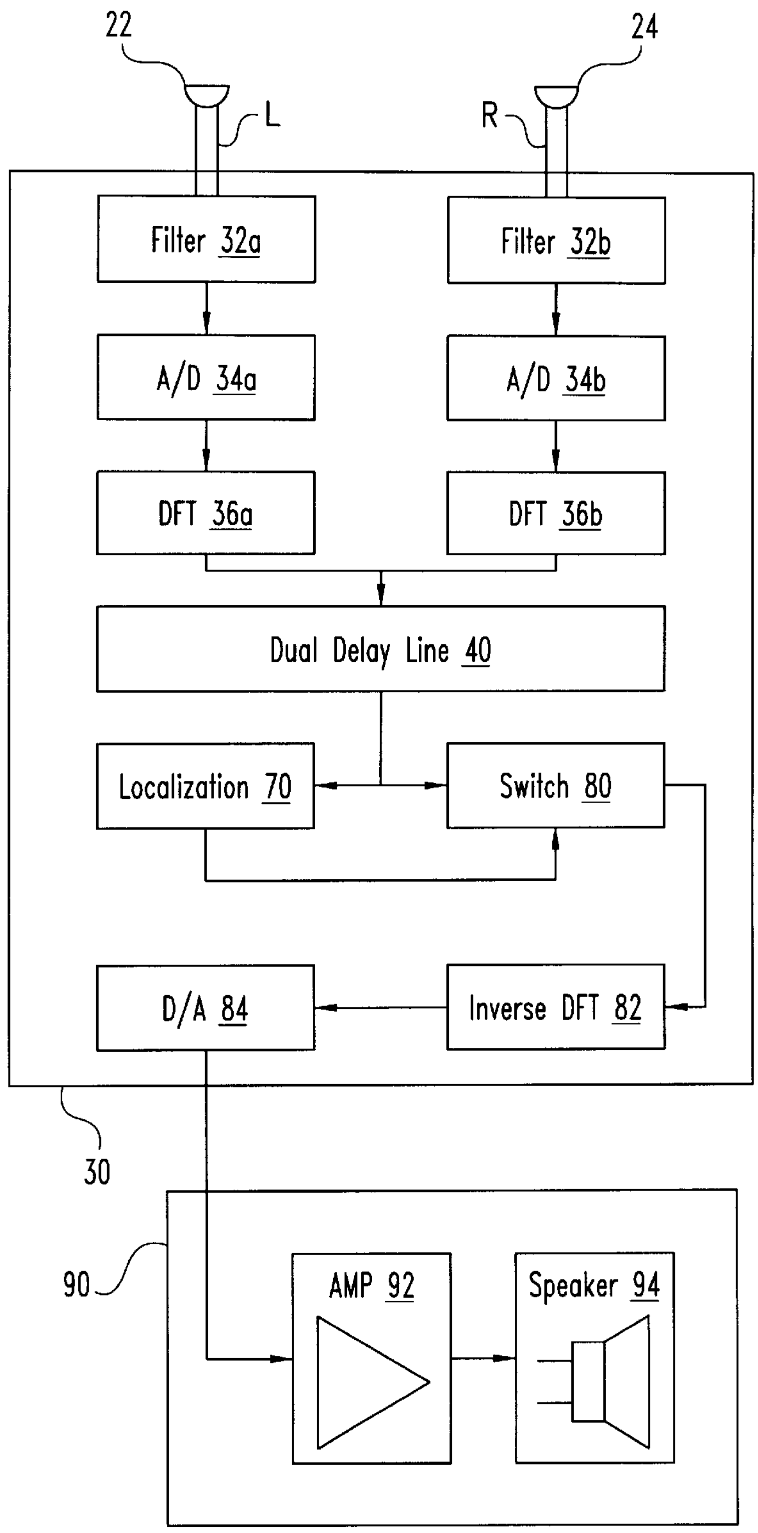
FIG. 2 is a signal flow diagram of an extraction process performed by the embodiment of FIG. 1.

Referring additionally to FIG. 2, a signal flow diagram illustrates various processing stages for the embodiment shown in FIG. 1. Sensors 22, 24 provide analog signals Lp(t) and Rp(t) corresponding to the left sensor 22, and right sensor 24, respectively. Signals Lp(t) and Rp(t) are initially input to processor 30 in separate processing channels L and R. For each channel L, R, signals Lp(t) and Rp(t) are conditioned and filtered in stages 32*a*, 32*b* to reduce aliasing, respectively. After filter stages 32*a*, 32*b*, the conditioned signals Lp(t), Rp(t) are input to corresponding Analog to Digital (A/D) converters 34*a*, 34*b* to provide discrete signals Lp(k), Rp(k), where k indexes discrete sampling events. In one embodiment, A/D stages 34*a*, 34*b* sample signals Lp(t) and Rp(t) at a rate of at least twice the frequency of the upper end of the audio frequency range to assure a high fidelity representation of the input signals.

Discrete signals Lp(k) and Rp(k) are transformed from the time domain to the frequency domain by a short-term Discrete Fourier Transform (DFT) algorithm in stages 36*a*, 36*b* to provide complex-valued signals XLp(m) and XRp(m). Signals XLp(m) and XRp(m) are evaluated in stages 36*a*, 36*b* at discrete frequencies $f_m$, where m is an index (m=1 to m=M) to discrete frequencies, and index p denotes the short-term spectral analysis time frame. Index p is arranged in reverse chronological order with the most recent time frame being p=1, the next most recent time frame being p=2, and so forth. Preferably, frequencies M encompass the audible frequency range and the number of samples employed in the short-term analysis is selected to strike an optimum balance between processing speed limitations and desired resolution of resulting output signals. In one embodiment, an audio range of 0.1 to 6 kHz is sampled in A/D stages 34*a*, 34*b* at a rate of at least 12.5 kHz with 512 samples per short-term spectral analysis time frame. In alternative embodiments, the frequency domain analysis may be provided by an analog filter bank employed before A/D stages 34*a*, 34*b*. It should be understood that the spectral signals XLp(m) and XRp(m) may be represented as arrays each having a 1×M dimension corresponding to the different frequencies $f_m$.

Figure 3:
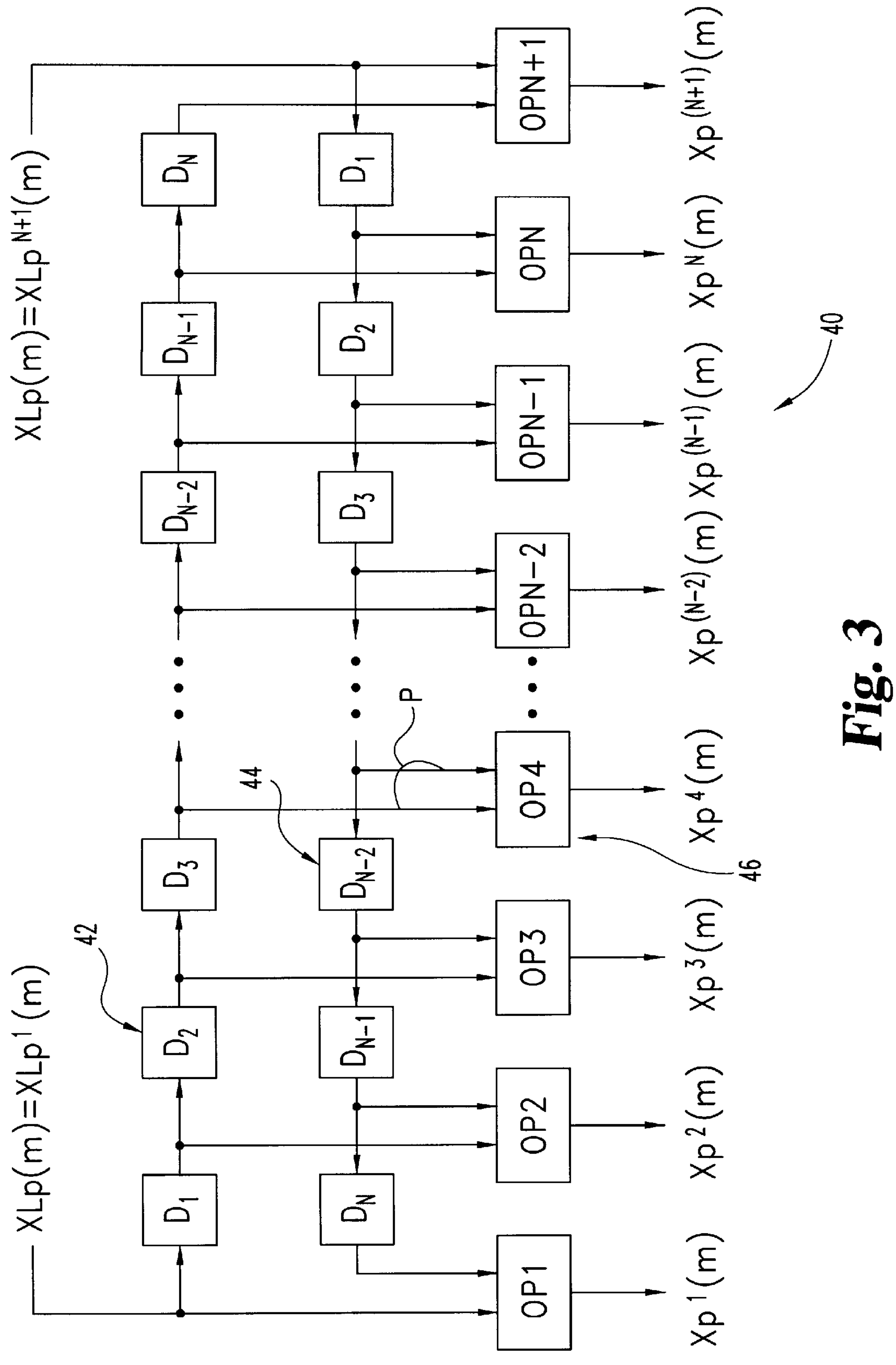
FIG. 3 is schematic representation of the dual delay line of FIG. 2.

Spectral signals XLp(m) and XRp(m) are input to dual delay line 40 as further detailed in FIG. 3. FIG. 3 depicts two delay lines 42, 44 each having N number of delay stages. Each delay line 42, 44 is sequentially configured with delay stages $D_1$ through $D_N$. Delay lines 42, 44 are configured to delay corresponding input signals in opposing directions from one delay stage to the next, and generally correspond to the dual hearing channels associated with a natural binaural hearing process. Delay stages $D_1$, $D_2$, $D_3$, . . . , $D_{N-2}$, $D_{N-1}$, and $D_N$ each delay an input signal by corresponding time delay increments $\tau_1$, $\tau_2$, $\tau_3$, . . . , $\tau_{N-2}$,$\tau_{N-1}$, and $\tau_N$, (collectively designated $\tau_i$), where index i goes from left to right. For delay line 42, XLp(m) is alternatively designated $XLp^1(m)$. $XLp^1(m)$ is sequentially delayed by time delay increments $\tau_1$, $\tau_2$, $\tau_3$, . . . , $\tau_{N-2}$, $\tau_{N-1}$, and $\tau_N$ to produce delayed outputs at the taps of delay line 42 which are respectively designated $XLp^2(m)$, $XLp^3(m)$, $Xlp^4(m)$, . . . , $XLp^{N-1}(m)$, $XLp^N(m)$, and $XLp^{N+1}(m)$; and collectively designated $XLp^i(m)$). For delay line 44, XRp(m) is alternatively designated $XRp^{N+1}(m)$. $XRp^{N+1}(m)$ is sequentially delayed by time delay increments $\tau_1$, $\tau_2$, $\tau_3$, . . . , $\tau_{N-2}$, $\tau_{N-1}$, and $\tau_N$ to produce delayed outputs at the taps of delay line 44 which are respectively designated: $XRp^N(m)$, $XRp^{N-1}(m)$, $XRp^{N-2}(m)$, . . . , $XLp^3(m)$, $XLp^2(m)$, and $Xlp^1(m)$; and collectively designated $XRp^i(m)$. The input spectral signals and the signals from delay line 42, 44 taps are arranged as input pairs to operation array 46. A pair of taps from delay lines 42, 44 is illustrated as input pair P in FIG. 3.

Operation array 46 has operation units (OP) numbered from 1 to N+1, depicted as OP1, OP2, OP3, OP4, . . . , OPN−2, OPN−1, OPN, OPN+1 and collectively designated operations OPi. Input pairs from delay lines 42, 44 correspond to the operations of array 46 as follows: OP1[$XLp^1(m)$, $XRp^1(m)$], OP2[$XLp^2(m)$, $XRp^2(m)$], OP3[$XLp^3(m)$, $XRp^3(m)$], OP4[$XLp^4(m)$, $XRp^4(m)$], . . . , OPN−2[$XLp^{(N-2)}(m)$, $XRp^{(N-2)}(m)$], OPN−1[$XLp^{(N-1)}(m)$, $XRp^{(N-1)}(m)$], OPN[$XLp^N(m)$, $XRp^N(m)$], and OPN+1 [$XLp^{(N+1)}(m)$, $XRp^{(N+1)}(m)$]; where OPi[$XLp^i(m)$, $XRp^i(m)$] indicates that OPi is determined as a function of input pair $XLp^i(m)$, $XRp^i(m)$. Correspondingly, the outputs of operation array 46 are $Xp^1(m)$, $Xp^2(m)$, $Xp^3(m)$, $Xp^4(m)$, . . . , $Xp^{(N-2)}(m)$, $Xp^{(N-1)}(m)$, $Xp^N(m)$, and $Xp^{(N+1)}(m)$ (collectively designated $Xp^i(m)$).

For i=1 to i≦N/2, operations for each OPi of array 46 are determined in accordance with complex expression 1 (CE1) as follows:

$$Xp^i(m)=\frac{XLp^i(m)-XRp^i(m)}{\exp[-j2\pi(\tau_i+\ldots+\tau_{N/2})f_m]-\exp[j2\pi(\tau_{((N/2)+1)}+\ldots+\tau_{(N-i+1)})f_m]},$$

where exp[argument] represents a natural exponent to the power of the argument, and imaginary number j is the square root of −1. For i>((N/2)+1) to i=N+1, operations of operation array 46 are determined in accordance complex expression 2 (CE2) as follows:

$$Xp^i(m)=\frac{XLp^i(m)-XRp^i(m)}{\exp[j2\pi(\tau_{((N/2)+1)}+\ldots+\tau_{(i-1)})f_m]-\exp[-j2\pi(\tau_{(N-i+2)}+\ldots+\tau_{N/2})f_m]},$$

where exp[argument] represents a natural exponent to the power of the argument, and imaginary number j is the square root of −1. For i=(N/2)+1, neither CE1 nor CE2 is performed.

An example of the determination of the operations for N=4(i=1 to i=N+1) is as follows:

i=1, CE1 applies as follows:

$$Xp^1(m)=\frac{XLp^1(m)-XRp^1(m)}{\exp[-j2\pi(\tau_1+\tau_2)f_m]-\exp[j2\pi(\tau_3+\tau_4)f_m]};$$

i=2≦(N/2), CE1 applies as follows:

$$Xp^2(m)=\frac{XLp^2(m)-XRp^2(m)}{\exp[-j2\pi(\tau_2)f_m]-\exp[j2\pi(\tau_3)f_m]};$$

i=3: Not applicable, (N/2)<i≦((N/2)+1);

i=4, CE2 applies as follows:

$$Xp^4(m)=\frac{XLp^4(m)-XRp^4(m)}{\exp[j2\pi(\tau_3)f_m]-\exp[-j2\pi(\tau_2)f_m]};\text{ and,}$$

i=5, CE2 applies as follows:

$$Xp^5(m) = \frac{XLp^5(m) - XRp^5(m)}{\exp[j2\pi(\tau_3+\tau_4)f_m] - \exp[-j2\pi(\tau_1+\tau_2)f_m]}.$$

Referring to FIGS. 1–3, each OPi of operation array 46 is defined to be representative of a different azimuthal position relative to reference axis R. The "center" operation, OPi where i=((N/2)+1), represents the location of the reference axis and source 12. For the example N=4, this center operation corresponds to i=3. This arrangement is analogous to the different interaural time differences associated with a natural binaural hearing system. In these natural systems, there is a relative position in each sound passageway within the ear that corresponds to a maximum "in phase" peak for a given sound source. Accordingly, each operation of array 46 represents a position corresponding to a potential azimuthal or angular position range for a sound source, with the center operation representing a source at the zero azimuth—a source aligned with reference axis R. For an environment having a single source without noise or interference, determining the signal pair with the maximum strength may be sufficient to locate the source with little additional processing; however, in noisy or multiple source environments, further processing may be needed to properly estimate locations.

It should be understood that dual delay line 40 provides a two dimensional matrix of outputs with N+1 columns corresponding to $Xp^i(m)$, and M rows corresponding to each discrete frequency $f_m$ of $Xp^i(m)$. This (N+1)×M matrix is determined for each short-term spectral analysis interval p. Furthermore, by subtracting $XRp^i(m)$ from $XLp^i(m)$, the denominator of each expression CE1, CE2 is arranged to provide a minimum value of $Xp^i(m)$ when the signal pair is "in-phase" at the given frequency $f_m$. Localization stage 70 uses this aspect of expressions CE1, CE2 evaluate the location of source 14 relative to source 12.

Localization stage 70 accumulates P number of these matrices to determine the $Xp^i(m)$ representative of the position of source 14. For each column i, localization stage 70 performs a summation of the amplitude of $|Xp^i(m)|$ to the second power over frequencies $f_m$ from m=1 to m=M. The summation is then multiplied by the inverse of M to find an average spectral energy as follows:

$$Xavgp^i = (1/M)\sum_{m=1}^{M} |Xp^i(m)|^2.$$

The resulting averages, $Xavgp^i$ are then time averaged over the P most recent spectralanalysis time frames indexed by p in accordance with:

$$X^i = \sum_{p=1}^{P} \gamma p \cdot Xavgp^i,$$

where γp are empirically determined weighting factors. In one embodiment, the γp factors are preferably between $0.85^P$ and $0.90^P$, where p is the short-term spectral analysis time frame index. The $X_i$ are analyzed to determine the minimum value, $\min(X^i)$. The index i of $\min(X^i)$, designated "I," estimates the column representing the azimuthal location of source 14 relative to source 12.

It has been discovered that the spectral content of a desired signal from source 12, when approximately aligned with reference axis R1, can be estimated from $Xp^I(m)$. In other words, the spectral signal output by array 46 which most closely corresponds to the relative location of the "off-axis" source 14 contemporaneously provides a spectral representation of a signal emanating from source 12. As a result, the signal processing of dual delay line 40 not only facilitates localization of source 14, but also provides a spectral estimate of the desired signal with only minimal post-localization processing to produce a representative output.

Post-localization processing includes provision of a designation signal by localization stage 70 to conceptual "switch" 80 to select the output column $Xp^I(m)$ of the dual delay line 40. The $Xp^I(m)$ is routed by switch 80 to an inverse Discrete Fourier Transform algorithm (Inverse DFT) in stage 82 for conversion from a frequency domain signal representation to a discrete time domain signal representation denoted as s(k). The signal estimate s(k) is then converted by Digital to Analog (D/A) converter 84 to provide an output signal to output device 80.

Output device 80 amplifies the output signal from processor 30 with amplifier 92 and supplies the amplified signal to speaker 94 to provide the extracted signal from a source 12.

It has been found that interference from off-axis sources separated by as little as 2 degrees from the on axis source may be reduced or eliminated with the present invention—even when the desired signal includes speech and the interference includes babble. Moreover, the present invention provides for the extraction of desired signals even when the interfering or noise signal is of equal or greater relative intensity. By moving sensors 22, 24 in tandem the signal selected to be extracted may correspondingly be changed. Moreover, the present invention may be employed in an environment having many sound sources in addition to sources 12, 14. In one alternative embodiment, the localization algorithm is configured to dynamically respond to relative positioning as well as relative strength, using automated learning techniques. In other embodiments, the present invention is adapted for use with highly directional microphones, more than two sensors to simultaneously extract multiple signals, and various adaptive amplification and filtering techniques known to those skilled in the art.

The present invention greatly improves computational efficiency compared to conventional systems by determining a spectral signal representative of the desired signal as part of the localization processing. As a result, an output signal characteristic of a desired signal from source 12 is determined as a function of the signal pair $XLp^I(m)$, $XRp^I(m)$ corresponding to the separation of source 14 from source 12. Also, the exponents in the denominator of CE1, CE2 correspond to phase difference of frequencies $f_m$ resulting from the separation of source 12 from 14. Referring to the example of N=4 and assuming that I=1, this phase difference is $-2\pi(\tau_1+\tau_2)f_m$ (for delay line 42) and $2\pi(\tau_3+\tau_4)f_m$ (for delay line 44) and corresponds to the separation of the representative location of off-axis source 14 from the on-axis source 12 at i=3. Likewise the time increments, $\tau_1+\tau_2$ and $\tau_3+\tau_4$, correspond to the separation of source 14 from source 12 for this example. Thus, processor 30 implements dual delay line 40 and corresponding operational relationships CE1, CE2 to provide a means for generating a desired signal by locating the position of an interfering signal source relative to the source of the desired signal.

It is preferred that $\tau_i$ be selected to provide generally equal azimuthal positions relative to reference axis R. In one embodiment, this arrangement corresponds to the values of $\tau_i$ changing about 20% from the smallest to the largest value. In other embodiments, $\tau_i$ are all generally equal to one another, simplifying the operations of array 46. Notably, the pair of time increments in the numerator of CE1, CE2 corresponding to the separation of the sources 12 and 14 become approximately equal when all values $\tau_i$ are generally the same.

Processor 30 may be comprised of one or more components or pieces of equipment. The processor may include digital circuits, analog circuits, or a combination of these circuit types. Processor 40 may be programmable, an integrated state machine, or utilize a combination of these techniques. Preferably, processor 40 is a solid state integrated digital signal processor circuit customized to perform the process of the present invention with a minimum of external components and connections. Similarly, the extraction process of the present invention may be performed on variously arranged processing equipment configured to provide the corresponding functionality with one or more hardware modules, firmware modules, software modules, or a combination thereof. Moreover, as used herein, "signal" includes, but is not limited to, software, firmware, hardware, programming variable, communication channel, and memory location representations.

Figure 4A:
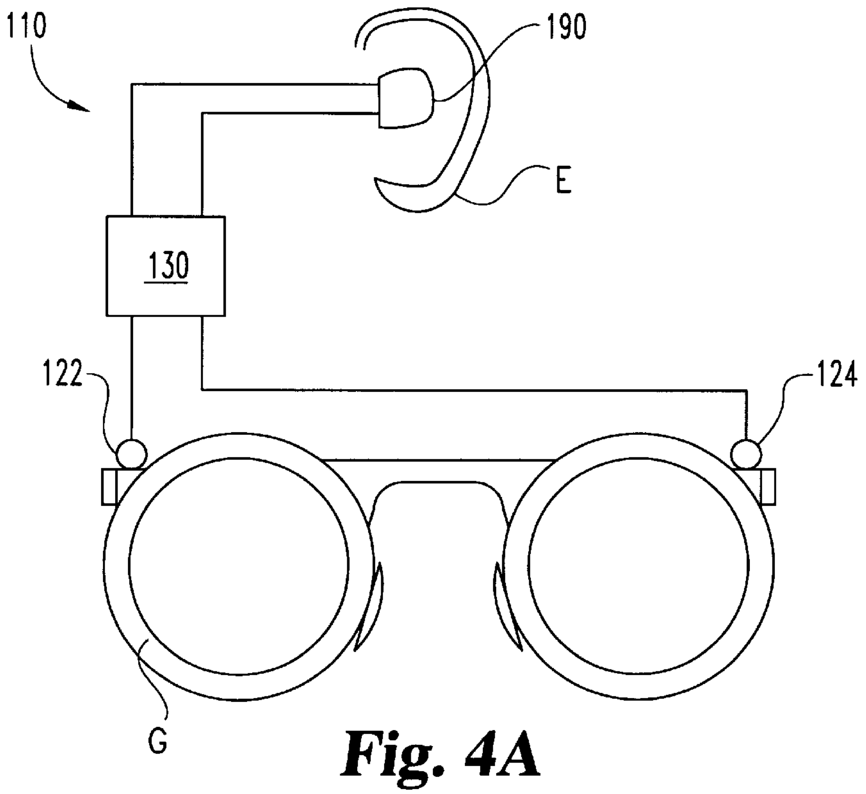
FIGS. 4A and 4B depict other embodiments of the present invention corresponding to hearing aid and computer voice recognition applications, respectively.

Referring to FIG. 4A, one application of the present invention is depicted as hearing aid system 110. System 110 includes eyeglasses G with microphones 122 and 124 fixed to glasses G and displaced from one another. Microphones 122, 124 are operatively coupled to hearing aid processor 130. Processor 130 is operatively coupled to output device 190. Output device 190 is positioned in ear E to provide an audio signal to the wearer.

Microphones 122, 124 are utilized in a manner similar to sensors 22, 24 of the embodiment depicted by FIGS. 1–3. Similarly, processor 130 is configured with the signal extraction process depicted in of FIGS. 1–3. Processor 130 provides the extracted signal to output device 190 to provide an audio output to the wearer. The wearer of system 110 may position glasses G to align with a desired sound source, such as a speech signal, to reduce interference from a nearby noise source off axis from the midpoint between microphones 122, 124. Moreover, the wearer may select a different signal by realigning with another desired sound source to reduce interference from a noisy environment.

Processor 130 and output device 190 may be separate units (as depicted) or included in a common unit worn in the ear. The coupling between processor 130 and output device 190 may be an electrical cable or a wireless transmission. In one alternative embodiment, sensors 122, 124 and processor 130 are remotely located and are configured to broadcast to one or more output devices 190 situated in the ear E via a radio frequency transmission or other conventional telecommunication method.

Figure 4B:
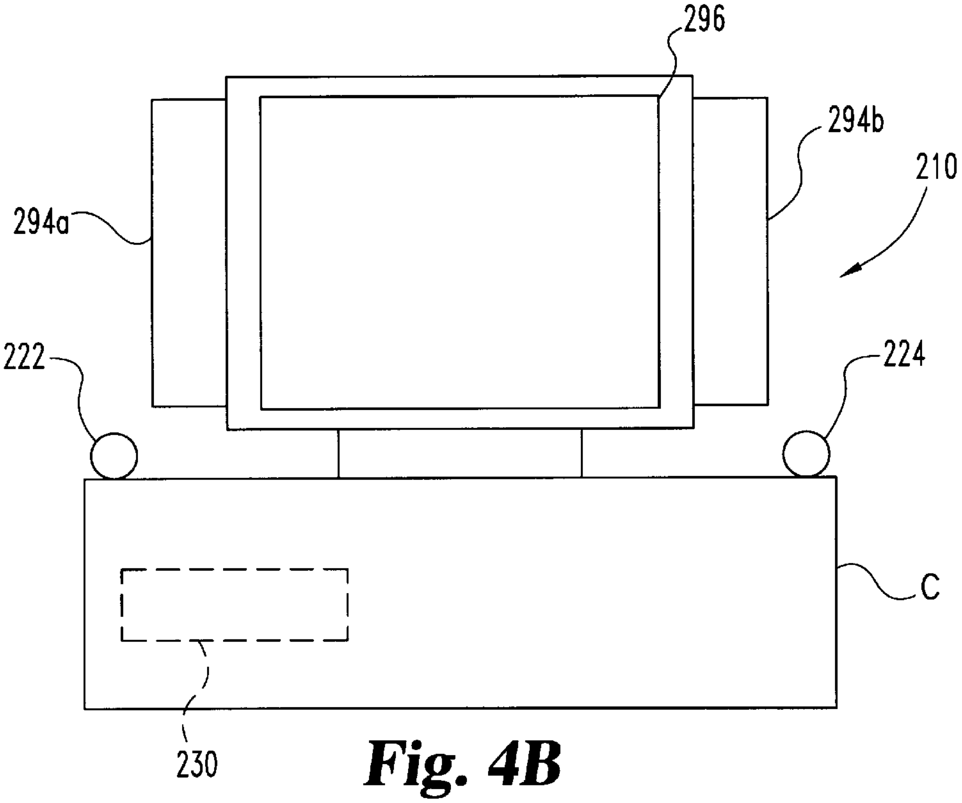

FIG. 4B shows a voice recognition system 210 employing the present invention as a front end speech enhancement device. System 210 includes personal computer C with two microphones 222, 224 spaced apart from each other in a predetermined relationship. Microphones 222, 224 are operatively coupled to a processor 230 within computer C. Processor 230 provides an output signal for internal use or responsive reply via speakers 294*a*, 294*b* or visual display 296. An operator aligns in a predetermined relationship with microphones 222, 224 of computer C to deliver voice commands. Computer C is configured to receive these voice commands, extracting the desired voice command from a noisy environment in accordance with the process system of FIGS. 1–3.

All publications and patent applications cited in this specification are herein incorporated by reference as if each individual publication or patent application were specifically and individually indicated to be incorporated by reference.

EXPERIMENTAL SECTION

The following experimental results are provided as non-limiting examples, and should not be construed to restrict the scope of the present invention.

A Sun Sparc-20 workstation was programmed to emulate the signal extraction process of the present invention. One loudspeaker (L1) was used to emit a speech signal and another loudspeaker (L2) was used to emit babble noise in a semi-anechoic room. Two microphones of a conventional type where positioned in the room and operatively coupled to the workstation. The microphones had an inter-microphone distance of about 15 centimeters and were positioned about 3 feet from L1. L1 was aligned with the midpoint between the microphones to define a zero degree azimuth. L2 was placed at different azimuths relative to L1 approximately equidistant to the midpoint between L1 and L2.

Figure 5:
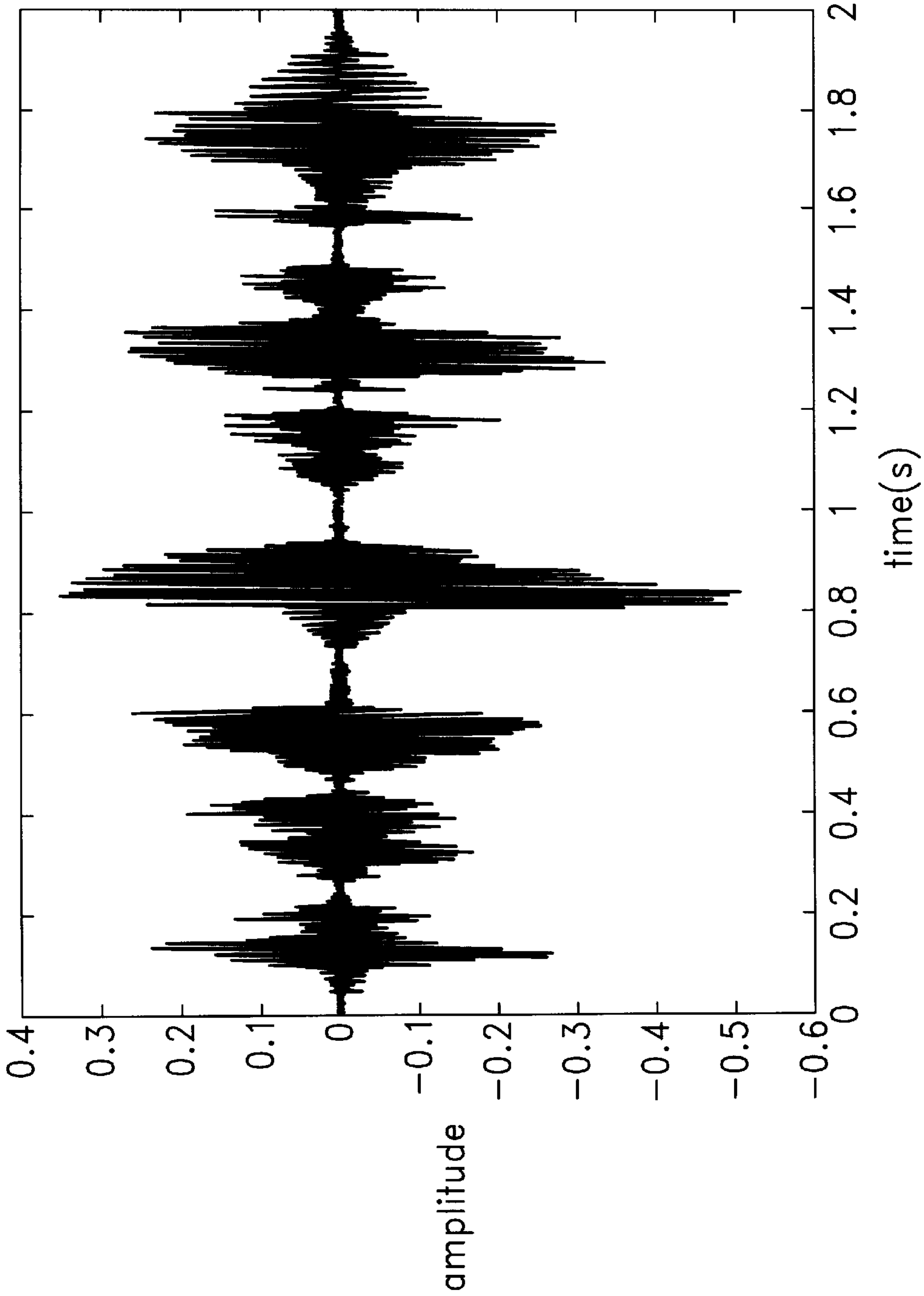
FIG. 5 is a graph of a speech signal in the form of a sentence about 2 seconds long.
Figure 6:
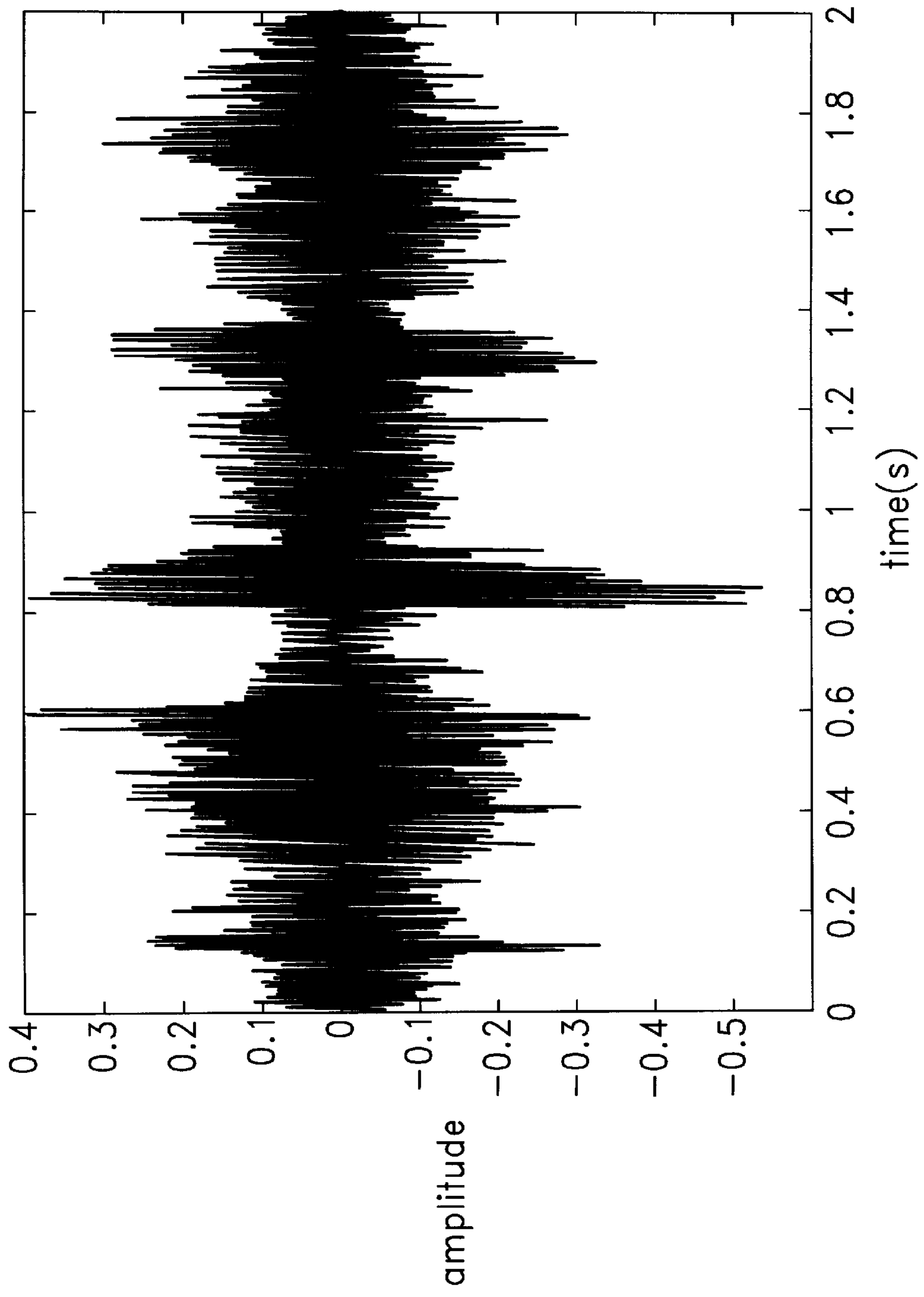
FIG. 6 is a graph of a composite signal including babble noise and the speech signal of FIG. 5 at a 0 dB signal-to-noise ratio with the babble noise source at about a 60 azimuth relative to the speech signal source.
Figure 7:
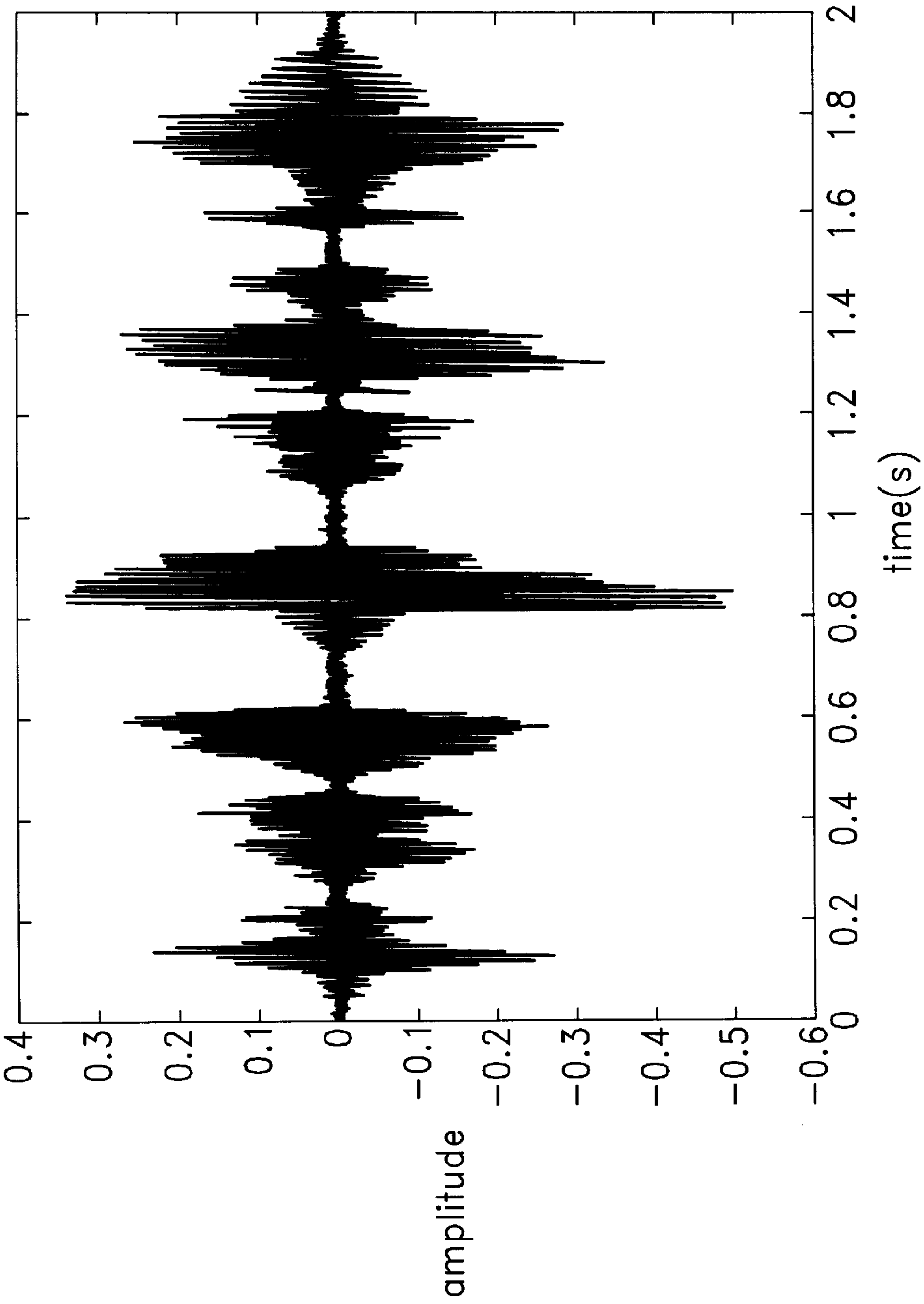
FIG. 7 is a graph of a signal representative of the speech signal of FIG. 5 after extraction from the composite signal of FIG. 6.

Referring to FIG. 5, a clean speech of a sentence about two seconds long is depicted, emanating from L1 without interference from L2. FIG. 6 depicts a composite signal from L1 and L2. The composite signal includes babble noise from L2 combined with the speech signal depicted in FIG. 5. The babble noise and speech signal are of generally equal intensity (0 dB) with L2 placed at a 60 degree azimuth relative to L1. FIG. 7 depicts the signal recovered from the composite signal of FIG. 6. This signal is nearly the same as the signal of FIG. 5.

Figure 8:
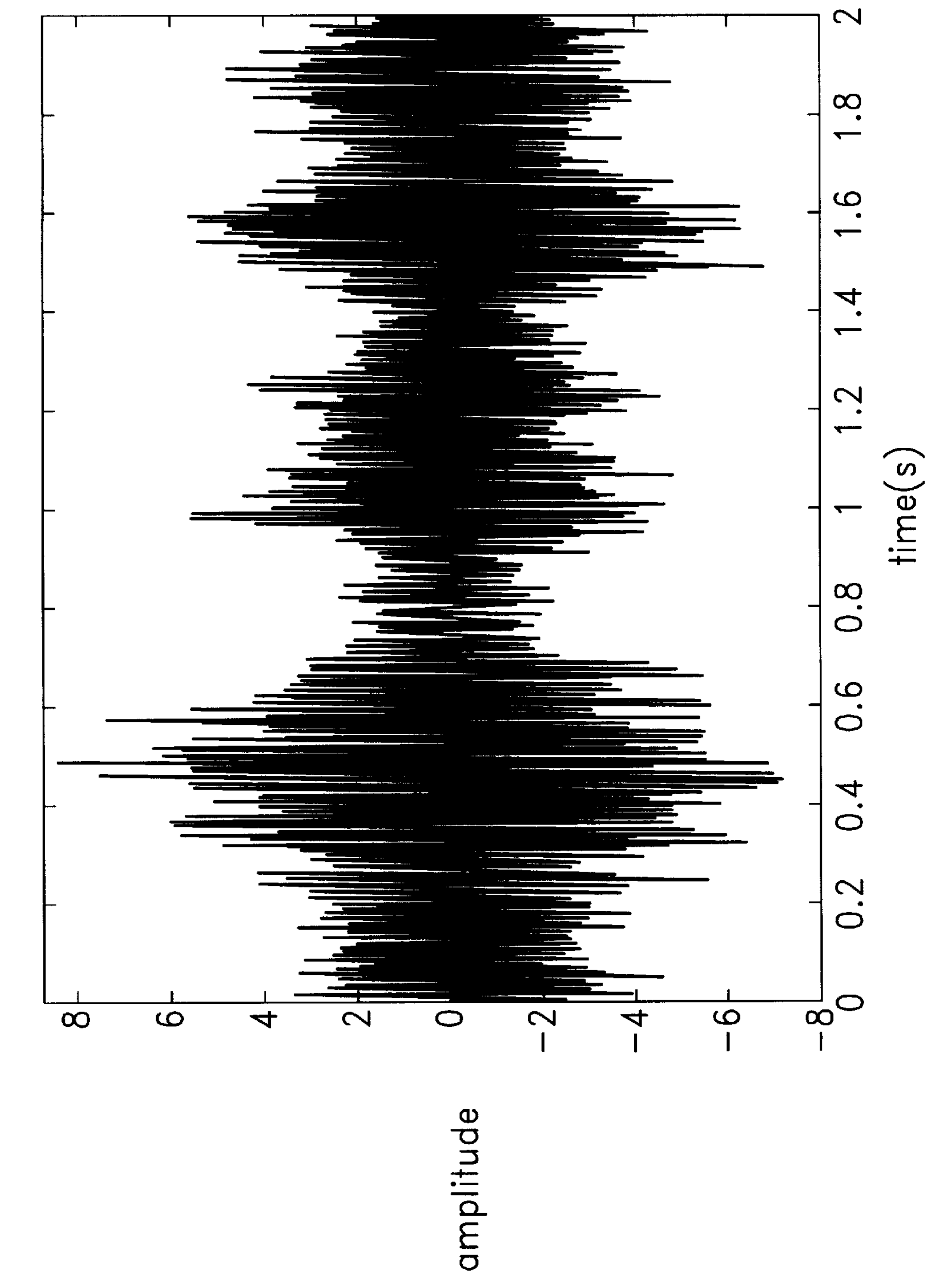
FIG. 8 is a graph of a composite signal including babble noise and the speech signal of FIG. 5 at a −30 dB signal-to-noise ratio with the babble noise source at a 2 degree azimuth relative to the speech signal source.
Figure 9:
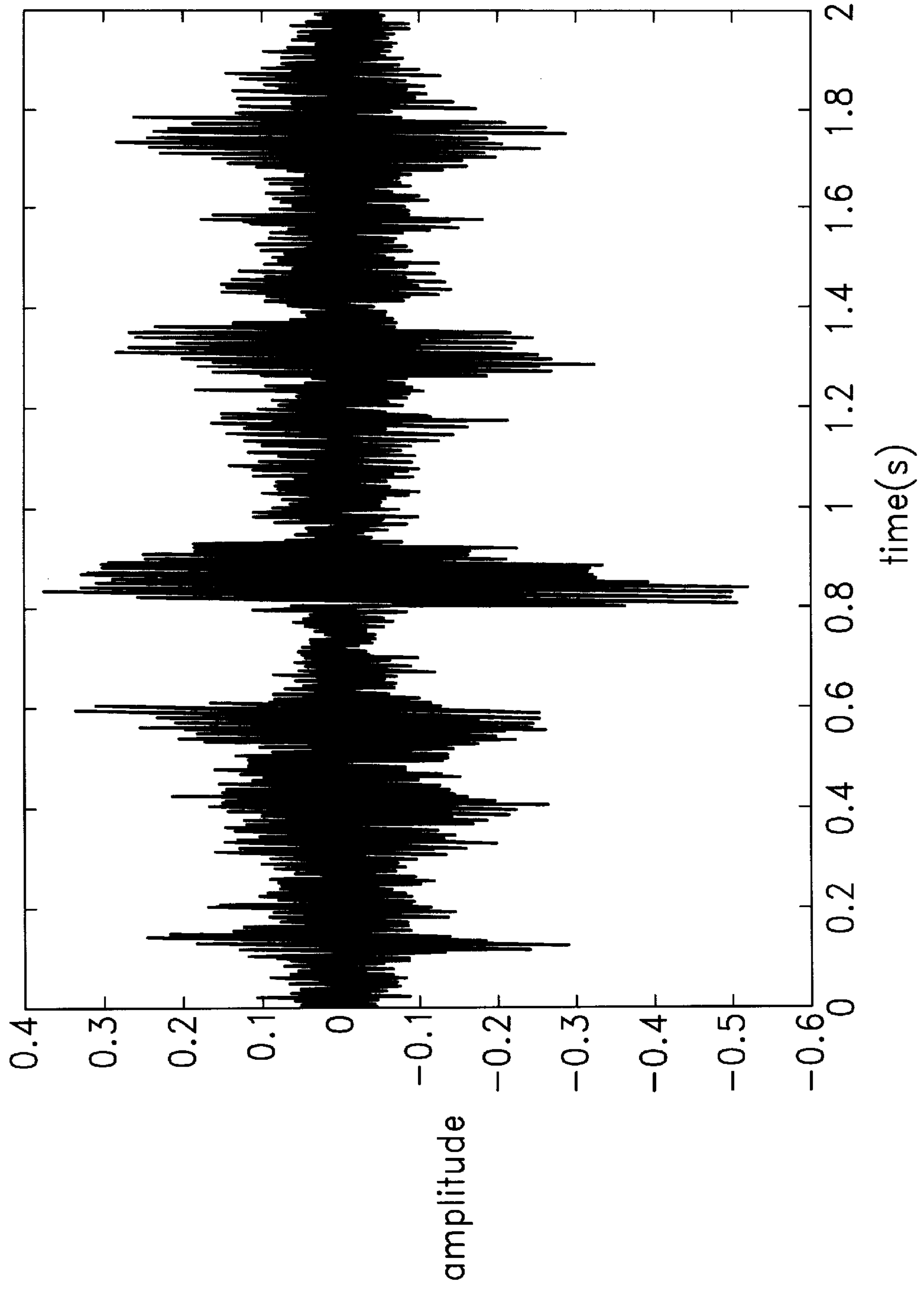
FIG. 9 is a graphic depiction of a signal representative of the sample speech signal of FIG. 5 after extraction from the composite signal of FIG. 8.

FIG. 8 depicts another composite signal where the babble noise is 30 dB more intense than the desired signal of FIG. 5. Furthermore, L2 is placed at only a 2 degree azimuth relative to L1. FIG. 9 depicts the signal recovered from the composite signal of FIG. 8, providing a clearly intelligible representation of the signal of FIG. 5 despite the greater intensity of the babble noise from L2 and the nearby location.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method of signal processing, comprising:

(a) detecting an acoustic excitation at both a first location to provide a corresponding first signal and at a second location to provide a corresponding second signal, the excitation being a composite of a desired acoustic signal from a first source and an interfering acoustic signal from a second source spaced apart from the first source;

(b) spatially localizing the second source relative to the first source as a function of the first and second signals;

(c) generating a characteristic signal representative of the desired acoustic signal during performance of said localizing; and wherein said localizing includes delaying each of the first and second signals by a number of time intervals to provide a number of delayed first signals and a number of delayed second signals, and determining a first time increment representative of separation of the first source from the second source, the characteristic signal being a function of the first time increment.

2. The method of claim 1, wherein the characteristic signal corresponds to spectral content of the desired acoustic signal and further comprising providing an output signal representative of the desired acoustic signal as a function of the characteristic signal.

3. The method of claim 1, wherein said localizing includes establishing a signal pair, the signal pair having a first member from the delayed first signals and a second member from the delayed second signals, the characteristic signal being determined from the signal pair.

4. The method of claim 1, further comprising providing an output signal representative of the desired acoustic signal, and wherein the desired acoustic signal includes speech and the output signal is provided by a hearing aid device.

5. The method of claim 1, wherein said localizing further includes:

(b1) converting the first and second signals from an analog representation to a discrete representation;

(b2) transforming the first and second signals from a time domain representation to a frequency domain representation; and (b3) establishing a signal pair representative of separation of the first source from the second source, the signal pair having a first member from the delayed first signals and a second member from the delayed second signals.

6. The method of claim 5, wherein the characteristic signal corresponds to a fraction with a numerator determined from at least the first and second members, and a denominator determined from at least the first time increment.

7. The method of claim 5, wherein said generating further includes:

(c1) determining the characteristic signal from the signal pair and the first time increment, the characteristic signal being representative of spectral content of the desired acoustic signal;

(c2) transforming the characteristic signal from a frequency domain representation to a time domain representation;

(c3) converting the characteristic signal from a discrete representation to an analog representation; and (c4) providing an audio output signal representative of the desired acoustic signal as a function of the characteristic signal.

8. The method of claim 7, further comprising establishing a second time increment corresponding to separation of the first source from the second source by comparing the delayed first and second signals, and wherein the first time increment corresponds to a first phase difference, the second time increment corresponds to a second phase difference, and the characteristic signal includes a spectral representation determined from at least the first and second phase differences.

9. The method of claim 1, wherein the desired acoustic signal has an intensity greater than the interfering acoustic signal when the first and second sources are each generally equidistant from a midpoint between the first and second locations.

10. The method of claim 1, wherein separation of the second source is within five degrees of the first source relative to a zero degree azimuthal reference axis intersecting the first source and a midpoint situated between the first and second locations.

11. The method of claim 1, further comprising:

(d) establishing a number of location signals, each corresponding to a different location relative to the first source; and (e) selecting the characteristic signal from the location signals, the characteristic signal being representative of location of the second source relative to the first source, the characteristic signal including a spectral representation of the desired acoustic signal.

12. The method of claim 1, wherein said spatially localizing includes processing the first signal and the second signal with a delay line.

13. A signal processing system, comprising:

(a) a first sensor at a first location configured to provide a first signal corresponding to an acoustic signal, said acoustic signal including a desired signal emanating from a selected source and noise emanating from a noise source;

(b) a second sensor at a second location configured to provide a second signal corresponding to said acoustic signal;

(c) a signal processor responsive to said first and second signals to generate a discrete first spectral signal corresponding to said first signal and a discrete second spectral signal corresponding to said second signal, said processor being configured to delay said first and second spectral signals by a number of time intervals to generate a number of delayed first signals and a number of delayed second signals and provide a time increment signal, said time increment signal corresponding to separation of the selected source from the noise source, and said processor being further configured to generate an output signal as a function of said time increment signal; and (d) an output device responsive to said output signal to provide an output representative of said desired signal.

14. The system of claim 13, wherein said first and second sensors each include a microphone and said output device includes an audio speaker.

15. The system of claim 13, wherein said processor includes an analog to digital conversion circuit configured to provide said discrete first spectral signal.

16. The system of claim 13, wherein generation of said first and second spectral signals includes execution of a discrete fourier transform algorithm.

17. The system of claim 13, wherein said first and second sensors are configured for movement to select said desired signal in accordance with position of said first and second sensors, said first and second sensors being configured to be spatially fixed relative to each other.

18. The system of claim 13, wherein each of said delayed first signals correspond to one of a number of first taps from a first delay line, and each of said delayed second signals correspond to one of a number of second taps from a second delay line.

19. The system of claim 18, wherein determination of said output signal corresponds to:

said first and second delay lines being configured in a dual delay line configuration;

said discrete first spectral signal being input to said first delay line and said discrete second spectral signal being input to said second delay line; and each of said first taps, said second taps, and said first and second spectral signals being arranged as a number of signal pairs, said signal pairs including a first portion of signal pairs and a second portion of signal pairs, said processor being configured to perform a first operation on each of said signal pairs of said first portion as a function of said time intervals, said processor being configured to perform a second operation on each of said signal pairs of said second portion as a function of said time intervals, said first operation being different from said second operation.

20. A signal processing system, comprising:

(a) a first sensor configured to provide a first signal corresponding to an acoustic excitation, said excitation including a first acoustic signal from a first source and a second acoustic signal from a second source displaced from the first source;

(b) a second sensor displaced from said first sensor and configured to provide a second signal corresponding to said excitation;

(c) a processor responsive to said first and second sensor signals, said processor including a means for generating a desired signal having a spectrum representative of said first acoustic signal, said means including a first delay line having a number of first taps to provide a number of delayed first signals and a second delay line having a number of second taps to provide a number of delayed second signals; and (d) an output means for generating a sensory output in response to said desired signal.

21. The system of claim 20, wherein said first and second sensors each include a microphone and said output means includes an audio speaker.

22. The system of claim 20, wherein said generating means includes executing a discrete fourier transform algorithm.

23. The system of claim 20, wherein said processor includes an analog to digital conversion circuit and a digital to analog conversion circuit.

24. The system of claim 20, wherein said first and second sensors are configured for movement to select said desired signal in accordance with position of said first and second sensors, said first and second sensors being configured to be spatially fixed relative to each other.

25. A method of signal processing, comprising:

(a) positioning a first and second sensor relative to a first signal source, the first and second sensor being spaced apart from each other, and a second signal source being spaced apart from the first signal source;

(b) providing a first signal from the first sensor and a second signal from the second signal, the first and second signals each being representative of a composite acoustic signal including a desired signal from the first signal source and an unwanted signal from the second signal source;

(c) establishing a number of spectral signals from the first and second signals as a function of a number of frequencies, each of the spectral signals representing a different position relative to the first signal source;

(d) determining a member of the spectral signals representative of position of the second signal source; and (e) generating an output signal from the member, the output signal being representative of spectral content of the first signal.

26. The method of claim 25, wherein the member is determined as a function of a phase difference value for a number of frequencies delayed by a first amount and a second amount.

27. The method of claim 25, wherein the desired signal includes speech and the output signal is provided by a hearing aid device.

28. The method of claim 25, further comprising repositioning the first and second sensors to extract a third signal from a third signal source.

29. The method of claim 25, wherein said establishing includes:

(a1) delaying each of the first and second signals by a number of time intervals to generate a number of delayed first signals and a number of delayed second signals; and (a2) comparing each of the delayed first signals to a corresponding one of the delayed second signals, each of the spectral signals being a function of at least one of the delayed first and second signals.

* * * * *